United States Patent [19]

Losada

[11] Patent Number: 4,703,883

[45] Date of Patent: Nov. 3, 1987

[54] FASTENER ASSEMBLY

[76] Inventor: Alfonaso Losada, 30 Stagg St., Stratford, Conn. 06497

[21] Appl. No.: 797,046

[22] Filed: Nov. 12, 1985

[51] Int. Cl.⁴ .......................... B25C 1/16; F16B 19/14
[52] U.S. Cl. ........................................ 227/9; 248/547; 411/439; 411/440; 411/441
[58] Field of Search .............................. 227/9, 10, 11; 248/216.1, 547; 411/439, 440, 441

[56] References Cited

U.S. PATENT DOCUMENTS 3,638,892  2/1972  Boye et al. ........................... 227/9 X

FOREIGN PATENT DOCUMENTS 0484427  8/1976  Australia .............................. 411/441
0518452  3/1953  Belgium ................................ 227/10

Primary Examiner—Mark Rosenbaum
Assistant Examiner—Taylor J. Ross
Attorney, Agent, or Firm—Arthur T. Fattibene

[57] ABSTRACT

A fastener assembly of the type which is forceably driven into a support structure, e.g. by a power actuated fastener gun. The fastener assembly is defined as a bracket plate having a surface or edge portion by which it is disposed in bearing relationship to a supporting surface, and which plate is formed with a depression or formed portion which is disposed out of the plane of the bearing portion. An aperture is formed to extend through the depressed portion formed out of the plane of the bracket plate and a stud having a pointed end is frictionally retained in said aperture, the stud being retained so that the pointed end does not extend beyond the bearing surfaces or edges of the bracket plate.

2 Claims, 6 Drawing Figures

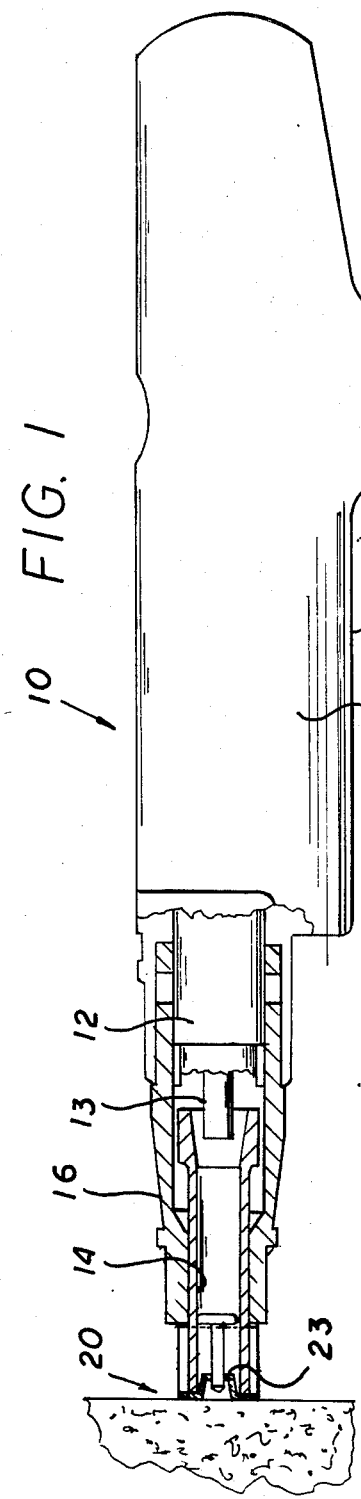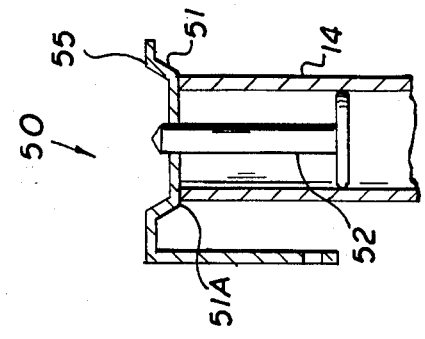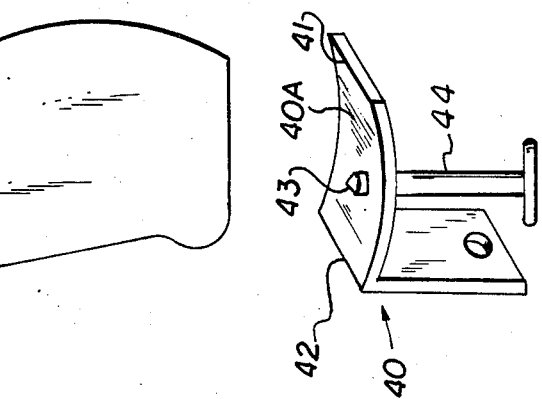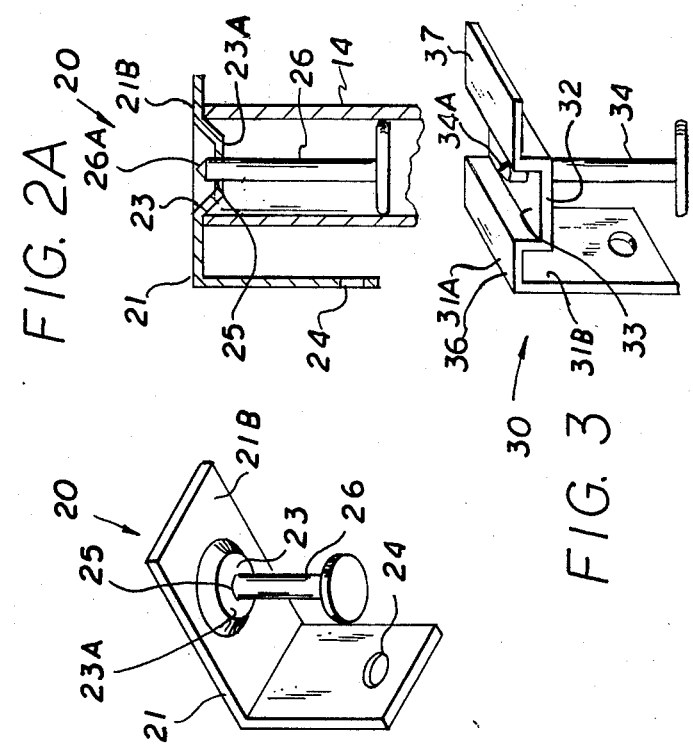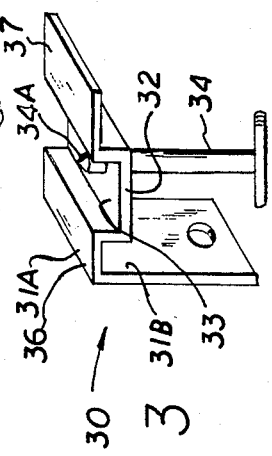

FASTENER ASSEMBLY

FIELD OF THE INVENTION

This invention is directed to an improved fastener assembly of the type which are intended to forceably be driven into a support wall or structure by a power actuated gun.

RELATED APPLICATION

This invention relates to improvements in fasteners of the type disclosed in a co-pending application, Ser. No. 785,274 filed Oct. 7, 1985, and now abandoned for A Powder Actuated Fastening System and Fastener Assembly for Use Therewith.

BACKGROUND OF THE INVENTION

In the construction trades and building industries, there is a need to apply numerous fasteners to a support structure or wall for various reasons, e.g. for supporting sub-structures such as holders or clamps for pipes, conduits, ceilings and for various other purposes. Frequently, such support walls are formed of stone, brick, masonry and the like, thereby making the driving of a stud or fastener exceedingly difficult.

To expedite the securing of such fasteners into concrete or masonry types of wall structures, there have been developed various power actuated guns to forceably drive or shoot such fasteners into a masonry wall. As a safety feature, such guns are constructed so that it is essential that the muzzle end of the gun be forceably pressed against the surface of the wall to effect a slight retraction thereof before the trigger can be actuated to set off the powder charge.

The fasteners heretofore known to be used with such guns included a bracket and an associated stud having a pointed end extending beyond the fastener. The arrangement was such that when such prior known fasteners were applied to the gun, the pointed end of the fastener generally defined the bearing point against which the pressure was applied to place the gun in firing condition. Because the point of the stud defined the bearing point, it frequently happened that the gun, due to its weight, fatigue or other reason, would be angled off the perpendicular causing the gun to misfire or not fire. As a result, there frequently resulted a dangerous condition if the gun was not disposed perpendicular to the support structure during a fastener firing operation.

The disclosure of the foregoing mentioned patent application discloses means for obviating the problem herein mentioned. This invention discloses a further solution to the problem.

OBJECTS

An object of this invention is to provide an improved fastener assembly of the type that is forceably driven into a support structure which is constructed so as to insure that the gun is disposed perpendicular to the wall so as to ensure proper actuation of the gun.

Another object is to provide an improved fastener construction that is positive in operation and which can be readily fabricated with a minimum of parts.

Another object is to provide a fastener assembly of the type that is forceably driven into a support structure which is rendered self-aligning to the muzzle of a fastener gun.

Another object is to provide a fastener assembly of the type that is forceably driven into a support structure having a planar bearing surface arranged to be perpendicularly disposed to a supporting wall.

SUMMARY OF THE INVENTION

The foregoing objects and other features and advantages of this invention are attained by a fastener assembly which includes a bracket plate, e.g. an angle member, washer, or other suitably shaped member having a planar portion formed with a depression or recess which is disposed out of the plane of the planar portion, and which depression or recess is provided with an aperture extending therethrough. A stud having a point on one end and a headed portion at its opposite end is provided with a diameter which is sized to be frictionally secured in the aperture. The arrangement is such that the stud is disposed normal to the planar portion whereby the pointed end of the stud is disposed within the recessed or depressed portion.

FEATURES

A feature of this invention resides in a fastener assembly which includes a bracket member having a planar portion with an apperture disposed in a recessed portion so that the planar portion maintains the bracket normal to a support structure.

Another feature resides in a gun fired fastener which includes a stud secured thereto, whereby the pointed end of the stud is recessed relative to the planar or bearing portion of the fastener.

Another feature resides in a gun fired fastener assembly which includes a bracket member which is recessed or depressed wherein the recessed portion in co-operation with the head of the studs aligns the fastener assembly in the muzzle of the powder actuated gun.

Other features and advantages will become more readily apparent when considered in view of the drawings in which:

FIG. 1 is a side view of a powder actuated fastener gun having a portion shown in section to illustrate the application of the improved fastener assembly.

FIG. 2 is a perspective view of the fastener assembly shown in FIG. 1.

FIG. 2A is a sectional view taken along lines 2A—2A in FIG. 2 with the fastener assembly fitted to the muzzle end of the gun.

FIG. 3 is a perspective view of another modified fastener assembly.

FIG. 4 is a perspective view of still another modified fastener assembly.

FIG. 5 is a perspective view of still another modified fastener assembly.

DETAILED DESCRIPTION

Referring to the drawings, there is shown in FIG. 1 a powder actuated fastener gun 10 of general construction. Such powder actuated guns are well known in the art. One such gun is manufactured by Hilti Fastening Systems of Tulsa, Oklahoma. Other makers make a similar tool. Such guns generally include a gun body 11 having a piston guide 12 in which a firing piston 13 is slidably mounted. Disposed in line with the piston guide 12 is the fastener guide 14 which defines the muzzle of the gun and which receives the stud of the fastener assembly as will be herein described. The fastener guide 14 is maintained relative to the firing piston 13 by a base plate or nose sleeve 16 which is slidably mounted relative to the piston guide 12. The gun 10 is constructed so that the muzzle end of the gun 10, with a fastener in place therein, must be pressed perpendicularly to the support structure S so that the fastener guide must be slightly retracted before the gun can fire. Normally, the prior known fasteners had a stud projecting beyond the bracket which define a point contact with the support surface, which frequently causes the gun to be angled relative to the support wall S rather than being held perpendicular thereto; and thereby causing the gun to misfire and/or to cause undesired angulation of the stud which could result in serious accidents.

In accordance with this invention, an improved fastener assembly 20 is provided for obviating the noted difficulties. As shown in FIG. 2, the fastener assembly 20 comprises a bracket or plate member 21, which is illustrated as an angled member having angularly disposed leg portions 21A and 21B. At least one leg portion, e.g. 21B, is provided with a recessed or depressed portion 23 which is disposed out of the plane of the leg portion 21B. The other leg portion 21A may be provided with an apperture 24 which may have suspended or secured therefrom a cable or wire for supporting framework of a suspended ceiling, conduits, pipes, etc.

In the illustrated embodiment of FIG. 2, the recessed portion is shown to be circular in shape and is sized so as to be snugly received in the end of the nozzle or fastener guide 14 of the gun 20. The bottom 23A of the recessed or depressed portion is provided with a hole or apperture 25 which extends therethrough. A stud 26 having a shank portion and a pointed end 26A is provided with a shank diameter which is sized so as to be frictionally retained to the hold or apperture 25, as best seen in 2A. The arrangement is such that the stud 26 is securely retained by a tight friction fit to the leg portion 21B so that pointed end 26A of the stud 26 does not extend beyond the planar surface of the leg portion 21B. The stud 26 is provided at its other end with a headed portion 26B. As best seen in FIGS. 1 and 2A, the headed portion 26B is formed with a diameter slightly less than the internal diameter of the fastener guide 14. Thus, as seen in FIG. 2A, the recessed or depressed portion 23, together with the headed end 26B of the stud, cooperate to define spaced apart bearing surfaces for maintaining the stud and associated bracket plate 21 normal or perpendicular to the axis of the gun muzzle. Also, as shown in FIGS. 1, 2, and 2A, the leg portion circumscribing the depressed or recessed piston forms a planar surface, which in the operative position bears normal to support wall S as best seen in FIG. 1, with the pointed end 26A of the stud interposed between the bottom 23A of the recess and the support wall S in the operative position. Thus, as seen in FIG. 1, the fastener bracket 21 and associated stud 26 are disposed normal to the wall to insure proper firing of the gun. The planar surface of the fastener thus insures that the gun with a fastener, as described, loaded thereto, will permit the user to automatically insure that the gun is disposed normal to the wall S.

It will be understood that the fastener member 21 may assume other shapes than as angle member. The fastener member may be a washer, a pipe clamp, and other shaped member.

FIG. 3 illustrates a modified fastener assembly. As shown, the fastener assembly 30 is also illustrated as an angle member 31 having opposed leg portions 31A and 31B. In this form of the invention, one leg member, e.g. leg portion 31A, is provided with a U-shaped channel formed therein, where the bottom 32 of the U-shaped channel is provided with an apperture 33 for frictionally receiving a stud 34 as herein described. As shown, the stud 34 is tightly retained to the apperture 33 as herein described so that the pointed end 34A is disposed within the U-shaped channel portion. In this construction, the portions or surfaces 36 and 37 extending laterally to either side of the channel define planar bearing surfaces to engage the supporting wall S when the fastener 30 is fitted to the gun 10 for placement.

FIG. 4 illustrates a further embodiment. In this form, the bracket 40, shown as an angle member provided with one leg portion 40A which is arcuate or bowed to define a pair of opposed bearing edges 41 and 42. Centrally disposed in the arcuate portion is an apperture 43 to which a stud 44, as herein described, is frictionally secured. As shown, the pointed end of the stud 44 is below a plan which contain the opposed bearing edges 41, 42. It will be apparent that when the fastener assembly 40 is fitted to the muzzle of the gun 20 for placement, that the opposed edges 41 and 42 will bear against the wall S to perpendicularly align the gun to the wall.

FIG. 5 illustrates another modified embodiment. In this form, the fastener assembly 50 is similar to the embodiment of FIG. 2, which the exception that the recessed portion 51 may be provided with an overall diameter greater than the internal diameter of the fastener guide 14 of the gun. With an enlarged recess diameter as shown in FIG. 5, the end of the muzzle or fastener guide 14 will bear on the bottom wall portion 51A of the recessed portion. In this embodiment, the stud 52 is frictionally retained in an appropriate sized hole formed in the bottom of the recessed portion, with the pointed end of the stud disposed to one side of the planar portion 55 of the angled bracket 50.

In each embodiment described, the stud is frictionally secured with the pointed end disposed to the outer side of the bearing surface or edge of the respective fasteners when placed against a supporting surface. With the fasteners described, two components are required, i.e., the plate member and the stud. Also, the bracket plate may take any desired bracket configuration so long as a portion or planar surface thereof is provided with a recess, depression or the like, which is greater than the length of the exposed stud tip.

While the foregoing has been described with respect to several embodiments thereof, it will be appreciated and understood that variations and modifications may be made without departing from the spirit or scope of the invention.

What is claimed is:

1. An improved fastener assembly of a type which is forceably driven into a support structure by a power actuated gun comprising
   a bracket plate,
   said bracket plate having a depression formed therein, wherein said depression is disposed out of the plane of said bracket plate to one side thereof, said depression being sized so as to be frictionally received in a muzzle end of a power tool,
   an aperture formed in said depression,
   and a stud having a head end portion, a shank portion and a pointed end portion, and
   said stud having a shank diameter sized so as to be frictionally retained in said aperture so that said stud is disposed normal to the plane of said bracket plate and said pointed end is disposed within said depression of said bracket plate, and said head end portion being sized to be received within the muzzle of a tool to provide a bearing surface, whereby said depression and the head end portion of said stud provides spaced apart bearing surfaces for maintaining the alignment of said fastener assembly normal to the axis of the muzzle end of a power tool.

2. An improved fastener assembly as defined in claim 1 wherein said bracket plate comprises an angled member having angularly disposed leg portions, said depression being formed on one of said leg portions.

* * * * *